US008060745B2

(12) United States Patent
Glickman

(10) Patent No.: US 8,060,745 B2
(45) Date of Patent: Nov. 15, 2011

(54) SECURITY FOR WIRELESS TRANSMISSION

(75) Inventor: Jeff Glickman, Las Vegas, NV (US)

(73) Assignee: Seiko Epson Corporation, Tokyo (JP)

( * ) Notice: Subject to any disclaimer, the term of this patent is extended or adjusted under 35 U.S.C. 154(b) by 1160 days.

(21) Appl. No.: 11/012,604

(22) Filed: Dec. 14, 2004

(65) Prior Publication Data
US 2005/0129242 A1 Jun. 16, 2005

Related U.S. Application Data

(60) Provisional application No. 60/530,403, filed on Dec. 16, 2003.

(51) Int. Cl.
*G06F 21/00* (2006.01)
*H04L 9/32* (2006.01)
*H04K 1/00* (2006.01)

(52) U.S. Cl. .................. 713/168; 726/6; 726/7; 726/18; 726/19

(58) Field of Classification Search ........................ None
See application file for complete search history.

(56) References Cited

U.S. PATENT DOCUMENTS

| | | | | |
|---|---|---|---|---|
| 4,200,770 | A | * | 4/1980 | Hellman et al. ................ 380/30 |
| 5,450,493 | A | * | 9/1995 | Maher ............................. 380/30 |
| 5,954,817 | A | | 9/1999 | Janssen et al. |
| 6,067,621 | A | * | 5/2000 | Yu et al. ........................ 713/172 |
| 6,148,404 | A | * | 11/2000 | Yatsukawa ........................ 726/2 |
| 6,226,618 | B1 | | 5/2001 | Downs et al. |
| 6,367,012 | B1 | | 4/2002 | Atkinson et al. |
| 6,769,060 | B1 | * | 7/2004 | Dent et al. ..................... 713/168 |
| 6,775,770 | B1 | * | 8/2004 | Davis et al. .................... 713/156 |
| 6,832,730 | B2 | * | 12/2004 | Conner et al. ................ 235/487 |
| 6,860,609 | B2 | | 3/2005 | Olson et al. |
| 6,915,398 | B2 | * | 7/2005 | Matsubara et al. ........... 711/163 |
| 6,948,066 | B2 | * | 9/2005 | Hind et al. ..................... 713/168 |
| 6,958,883 | B2 | * | 10/2005 | Conner et al. ............. 360/97.01 |
| 6,968,453 | B2 | * | 11/2005 | Doyle et al. ................... 713/168 |
| 7,013,153 | B2 | * | 3/2006 | Beamish et al. .............. 455/462 |
| 7,054,845 | B2 | * | 5/2006 | Oshima et al. ................... 705/78 |
| 7,071,990 | B2 | * | 7/2006 | Kondo ........................... 348/383 |
| 7,120,797 | B2 | * | 10/2006 | Wheeler ....................... 713/176 |
| 7,246,236 | B2 | * | 7/2007 | Stirbu ............................ 713/168 |
| 7,278,024 | B2 | * | 10/2007 | Sundararajan et al. ....... 713/183 |

(Continued)

FOREIGN PATENT DOCUMENTS

CN 1282475 A 1/2001

(Continued)

OTHER PUBLICATIONS

Pettelkau, Jeff. Toshiba TDP-SW20 Wireless DLP Projector. Oct. 2004. Retrieved from the Internet: <URL: http://www.jiwire.com/toshiba-TDP-SW20-wireless-projector-photo-image-gallery.htm>.

(Continued)

*Primary Examiner* — Christopher Revak
(74) *Attorney, Agent, or Firm* — Kilpatrick Townsend & Stockton LLP

(57) ABSTRACT

The present invention provides a method of securing transmission of content over a wireless network. The method may include initiating a relationship between a content source and a display system, establishing a relationship between the content source and the display system including negotiating a shared key and encrypting content for transmission between the content source and the display system.

24 Claims, 2 Drawing Sheets

U.S. PATENT DOCUMENTS

| | | | |
|---|---|---|---|
| 7,308,250 B2 * | 12/2007 | Khare et al. | 455/411 |
| 7,350,076 B1 * | 3/2008 | Young et al. | 713/169 |
| 7,409,705 B2 * | 8/2008 | Ueda et al. | 726/5 |
| 7,805,372 B2 * | 9/2010 | Weiss | 705/51 |
| 7,809,651 B2 * | 10/2010 | Weiss | 705/68 |
| 2001/0020276 A1 * | 9/2001 | Kim et al. | 713/202 |
| 2001/0033404 A1 | 10/2001 | Escobosa et al. | |
| 2002/0012433 A1 | 1/2002 | Haverinen et al. | |
| 2002/0066042 A1 * | 5/2002 | Matsumoto et al. | 713/202 |
| 2002/0095507 A1 * | 7/2002 | Jerdonek | 709/229 |
| 2002/0186846 A1 * | 12/2002 | Nyberg et al. | 380/273 |
| 2003/0017846 A1 | 1/2003 | Estevez et al. | |
| 2003/0084304 A1 * | 5/2003 | Hon et al. | 713/185 |
| 2003/0212894 A1 * | 11/2003 | Buck et al. | 713/184 |
| 2004/0073795 A1 * | 4/2004 | Jablon | 713/171 |
| 2004/0187018 A1 * | 9/2004 | Owen et al. | 713/200 |
| 2005/0015604 A1 * | 1/2005 | Sundararajan et al. | 713/184 |
| 2005/0050004 A1 * | 3/2005 | Sheu et al. | 707/1 |
| 2006/0107316 A1 * | 5/2006 | Fiske | 726/18 |
| 2006/0143458 A1 * | 6/2006 | Tie et al. | 713/176 |
| 2006/0167821 A1 * | 7/2006 | Oshima et al. | 705/71 |
| 2006/0205388 A1 * | 9/2006 | Semple et al. | 455/411 |
| 2007/0195077 A1 * | 8/2007 | Hwang et al. | 345/204 |
| 2009/0307767 A1 * | 12/2009 | Semba | 726/18 |
| 2010/0283586 A1 * | 11/2010 | Ikeda et al. | 340/10.42 |
| 2011/0007901 A1 * | 1/2011 | Ikeda et al. | 380/270 |

FOREIGN PATENT DOCUMENTS

| | | |
|---|---|---|
| WO | WO 99/33224 A1 | 7/1999 |

OTHER PUBLICATIONS

Babel et al., *Lossless and lossy minimal redundancy pyramidal decomposition for scalable image compression technique*, UMR CNRS 6164 IETR Groupe Image ICASSP 2003, pp. 249-252.

You et al, *Pyramidal image compression using anisotropic and error-corrected interpolation*, Department of Electrical Engineering, University of Minnesota.

* cited by examiner

SECURITY FOR WIRELESS TRANSMISSION

CROSS-REFERENCE TO RELATED APPLICATION

The present application claims priority from U.S. Provisional Patent Application Ser. No. 60/530,403 filed Dec. 16, 2003, hereby incorporated by reference in its entirety for all purposes.

TECHNICAL FIELD

The present disclosure relates generally to apparatus, systems and methods for securing data transmission, and more specifically, to apparatus, systems and methods for securing wireless data transmissions.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

Figure 1:
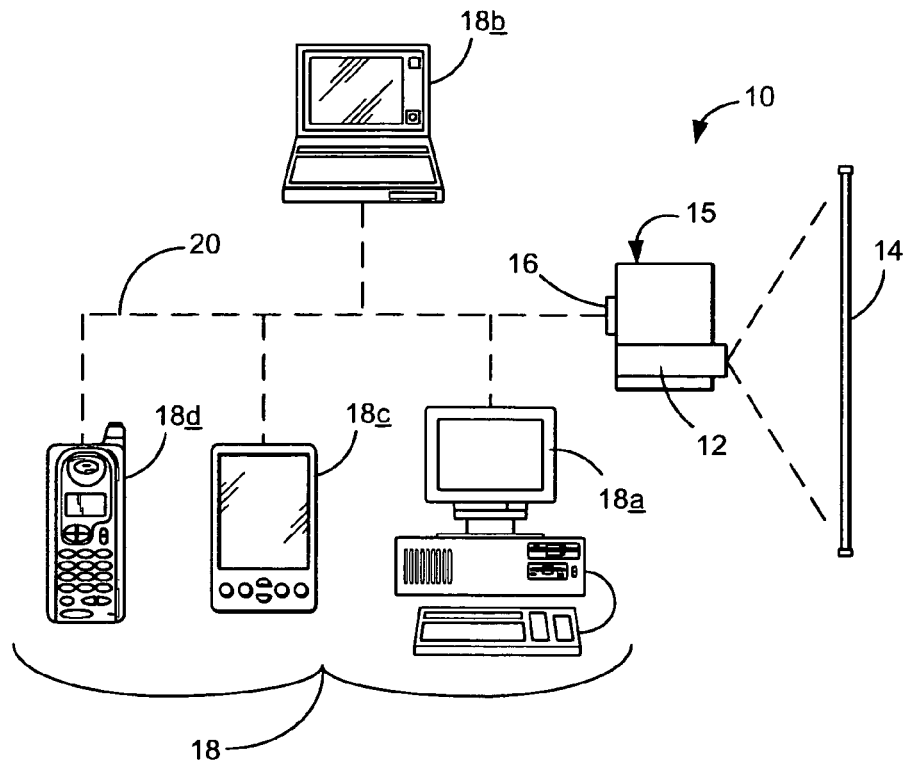
FIG. 1 is a schematic diagram of an image-processing system according to an embodiment of the present disclosure.

Referring initially to FIG. 1, an image-processing system is shown generally at 10 according to an embodiment of the present disclosure. Image-processing system 10 includes a display system 15 having an image display device, such as a projection device or image projector 12. Image projector 12 may be configured to display or project an image on a viewing surface 14. The image display device may be any suitable type of device adapted to project or display a video or data image. Examples include, but are not limited to, liquid crystal display (LCD) and digital light processing (DLP) projectors. Furthermore, it will be appreciated that image display devices, such as projection device 12, may be incorporated within other types of devices, including, but not limited to, television systems, computer monitors, etc.

The display system within image-processing system 10 may also include an image-rendering device 16. Image-rendering device 16 may be associated with or integrated within the image display device. Typically, image-rendering device 16 will be in electrical communication with one or more image or content sources 18. Image-rendering device 16 may be configured to receive content, such as image data or programs, transmitted by content sources 18, and to render the received image data for display by the image display device. It should be appreciated that image data may be any displayable images, including video images, still images, text, data images, etc.

Image-rendering device 16 may be integrated into the image display device, or may be provided as a separate component that is connectable to the image display device. An example of a one type of image-rendering device is disclosed in U.S. patent application Ser. No. 10/453,905, filed on Jun. 2, 2003, the disclosure which is hereby incorporated by reference.

In some embodiments, image-rendering device 16 may be adapted to receive a data transfer device that may enable image-rendering device 16 to receive content from content sources 18. Any suitable data transfer device may be coupled with or integrated within image-rendering device 16. For example, the data transfer device may be a card, an expansion board, an adapter or other suitable device. More specifically, the data transfer device may be a network interface card, such as a wireless network card, such as wireless LAN card, such as IEEE 802.11a, 802.11b, 802.11g, 802.11x, a radio card, a Bluetooth radio card, a ZigBee radio, etc. In some embodiments, the data transfer device may further include or be interchanged with a wired network card, such as an IEEE 802.3 standard wired local area network (LAN) interface card, e.g. Ethernet, 100BASE-T standard (IEEE 802.3u) or fast Ethernet, IEEE 802.3z or gigabit Ethernet, and/or other suitable wired network interface.

The data transfer device may enable communication and content transmission from a content source 18 to the display system. Content sources 18 may include any suitable source that is capable of providing content, such as image data, to the display system. Examples of content sources include, but are not limited to, desktop computers and/or servers 18a, laptop computers 18b, personal digital assistants (PDAs) 18c, mobile telephones 18d, etc.

Content sources 18 may communicate electrically with image-rendering device 16 in any suitable manner. In the depicted embodiment, each content source 18 may be configured to communicate electrically with image-rendering device 16 over a communication link, such as a wireless network 20. However, one or more content sources 18 may also communicate with image-rendering device 16 over a wired network, or over a wireless or wired direct connection, or any combination thereof.

Content sources 18 may be configured to provide any suitable type of image data to image-rendering device 16, for example, JPEG, MPEG and other pre-compressed files. Alternatively or additionally, content sources 18 may be configured to generate raw data files from images displayed on a screen of the content source, and then to compress the files using a fast compression technique, such as an LZO compression technique, for transmission to image-rendering device 16 in real-time. Thus, an image displayed on a screen of a content source 18 (or any raw data file on content source 18) may be transmitted to and displayed by projection device 12.

Wirelessly connecting the image projector to a computer may eliminate some of the frustrations that may arise when attempting to physically connect a computer to an image projector. However, the security of a wireless transmission between the image projector and the computer may be of some concern. For example, third parties may be able to interrupt or intercept transmissions between a computer and an image projector. Moreover, in some networks systems, images may be wirelessly transmitted from a computer not disposed near the image projector. Transmission over a large physical area may potentially expose the transmitted images (or content) to one or more undesired recipients.

Figure 2:
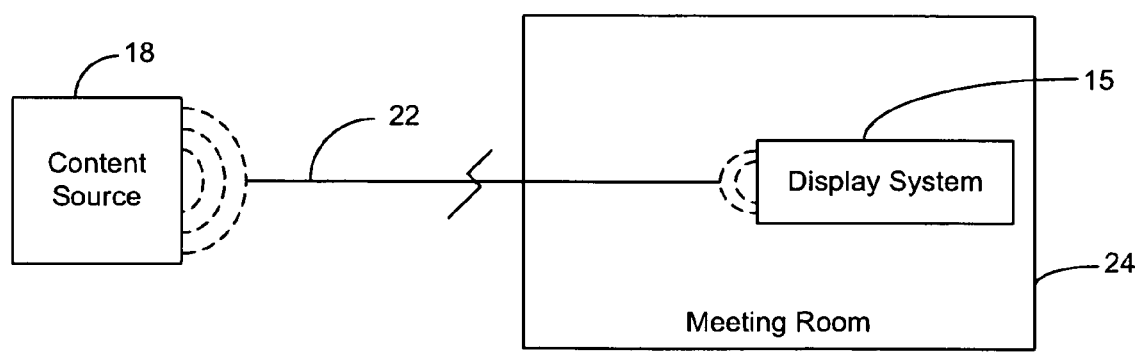
FIG. 2 is a schematic diagram of a transmission of content over a wireless network from a content source to a display system according to an embodiment of the present disclosure.

FIG. 2 illustrates transmission between a content source and a display system. Specifically, content source 18 may be configured to electrically communicate with display system 15. As described above, the display system may include any suitable image display device, including, but not limited to, a projection device and/or an image-rendering device. Display system 15 may be configured to wirelessly receive content over a communication link 22. The exemplary communication link may be a wireless channel. The wireless channel may enable linkage to any suitable network, including, but not limited to, a local area wireless network (LAN).

As illustrated, content source 18 may communicate with display system 15 over a wireless channel. It should be appreciated that content source 18 may be remotely positioned relative display system 15. For example, content source 18 may be physically disposed in a different room, different floor, different building, etc. from display system 15. In the exemplary embodiment, display system 15 may be disposed in a conference room or meeting room 24.

Content source 18 may be linked to the display system over a network, but be physically located outside the meeting room. For example, content source 18 may be a personal computer in an employee's office or cubicle. Content to be presented may reside on such an employee's computer (or on a portion of a network accessible to the employee's computer) and may be transmitted wirelessly to display system 15 in meeting room 24 without the employee having to transport their computer, or an electronic storage medium, to the meeting room. Alternatively, in some embodiments, the content source may be disposed in the meeting room. It should be appreciated that the transmission from content source 18 to display system 15 may be through one or more wired or wireless networks, or combination thereof.

In some situations, there may be a reasonable apprehension regarding the security of the wireless channel. For example, a user may be reluctant to transmit content from a personal content source over a wireless channel due to the fear that the content may be potentially intercepted by third-party sources, such as unauthorized employees, competitors, industry spies, etc. Use of security measures in transmission and receipt of content over the wireless channel may relieve some of these concerns.

Figure 3:
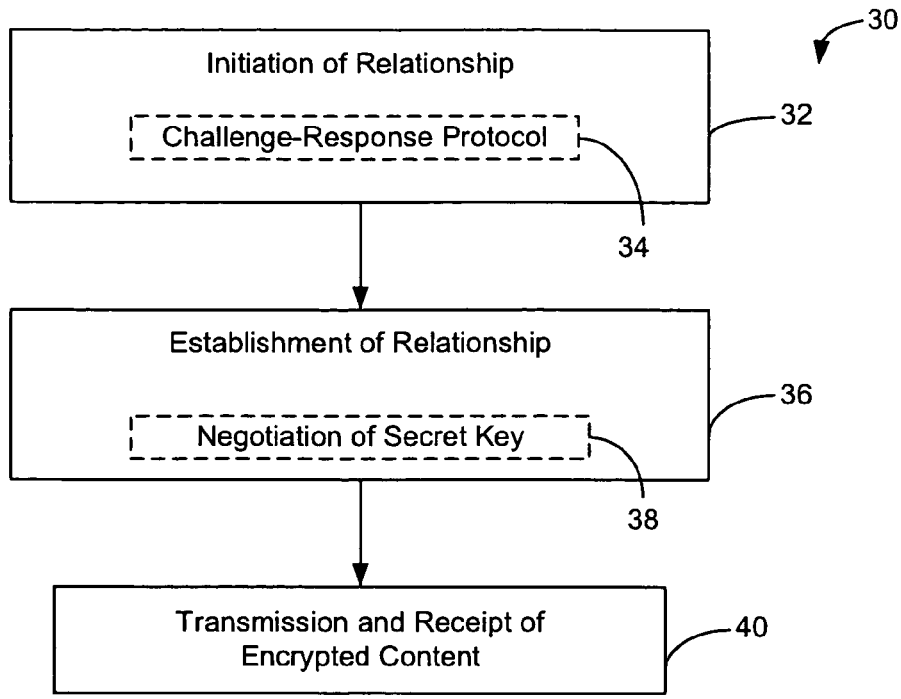
FIG. 3 is a schematic diagram of a method of securing transmission of content over a wireless network according to an embodiment of the present disclosure.

For example, in one embodiment of the present disclosure, a multi-step security system may be implemented. An exemplary embodiment is shown in FIG. 3, at 30, where a three-step security system for transmission of content over a wireless system is illustrated. It should be noted that other security systems may be implemented, but the present disclosure provides a relatively low-cost system that would likely require significant expenditure to overcome.

In the multi-step security system illustrated, the first step is initiation of the relationship at 32. Initiation of the relationship may include the first or initial communication(s) between the content source and the display system over the wireless channel. The initiation of relationship step is configured to provide a method where the content source and display system recognize each other as "partners" in the transmission of content over the wireless channel. This transmission of content over the wireless channel between the content source and the display system may be considered a conversation.

Figure 4:
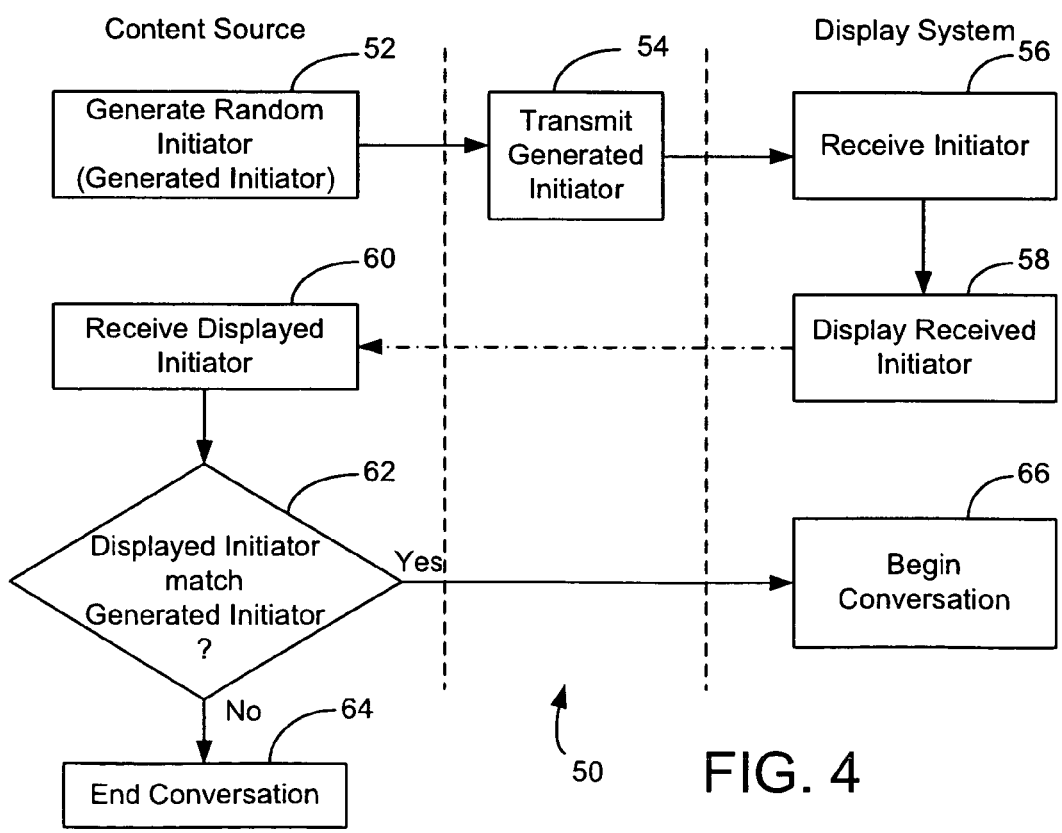
FIG. 4 is a schematic diagram of a method of initiating a relationship between a content source and a display system according to an embodiment of the present disclosure.

Any suitable method may be used to initiate the conversation and identify/authorize the communicating parties. One example, described in more detail below in regards to FIG. 4, is an authentication protocol, such as a Challenge-Response protocol 34. Briefly, the protocol operates as a remote log-on for verifying the identity of the content source and/or the image source. For example, in some embodiments, the content source may provide a challenge (request for authentic response) to the display system. The display system may be used to generate a response. If the response correlates with the challenge, the conversation may be initiated.

It should be appreciated that the challenge-response protocol may be used at multiple points during a conversation to ensure that the communicating content source is the authentic content source. As an exemplary embodiment, initiating a relationship between a content source and a display system may include manually inputting into the content source transmitted authentication data (such as an initiator described in more detail below) where the transmitted authentication data was originally sent from the content source to the display system and displayed on the display system. In other embodiments, the initiator may be automatically received by the content source. For example, manual input may not be necessary for receipt of the initiator.

After initiating the relationship and verifying the identity of the content source, the relationship may be established, at 36. Establishment of the relationship may include a method for exchanging a secret key over the unsecured wireless channel, such as through public key cryptography. One exemplary protocol which may be used to negotiate a secret key may be the use of the Diffie-Hellman key exchange or exponential key agreement. The Diffie-Hellman key exchange may enable the content source and the display system to establish a key that can be used to encrypt subsequent content exchanged between the content source and the display system. Diffe-Hellman and other protocols may use one or more public keys or other suitable algorithms to negotiate a secret key. It should be appreciated that any other such protocols or combination of protocols that are configured to establish communication may be used without departing from the scope of the invention.

In some embodiments, a private/public key algorithm may be used to establish the relationship or other suitable encrypted or noncrypted system may be used.

Once communication is established, content may be encrypted and decrypted using any suitable cryptosystem, as indicated at 40 in FIG. 3. For example, content may be encrypted and decrypted using the Advanced Encryption Standard (AES) or any other suitable cryptographic algorithm.

It should be appreciated that any other suitable steps may be included in the multi-step security system. Thus, although a three-step security system is described, other step combinations may be used to secure the wireless channel. Moreover, one or more of the above steps may be absent or substituted without departing from the scope of the invention.

FIG. 4 further illustrates, at 50, an exemplary method of initiating the relationship between the content source and the display system. As illustrated, FIG. 4 generally describes a Challenge-Response protocol over a wireless network between a content source, such as a user's computer, and a display system. In the exemplary embodiment, the method of initiating the response may include the content source transmitting a challenge to the display system. For example, the content source may generate a random initiator (generated initiator) at 52. The generated initiator may be a number, an alphanumeric code, etc. The generated initiator may be transmitted, at 54, over the wireless network to a receiving device, such as a display system.

The display system may receive the transmitted initiator (at 56) and display the received initiator to a user. Display of the transmitted initiator may include projecting the received initiator onto a viewing surface. For example, a user's computer (the content source) may generate a random number and transmit the random number to a projection device or other suitable display system. The projection device may project and/or display the received random number on a display surface, such as a screen. In some embodiments, the generated initiator may be received by the display system without being displayed. For example, in some embodiments, the generated initiator may be automatically sent and received by the display system. The display system may then automatically transmit or otherwise send the initiator, considered a response initiator, to the content source, such that the response initiator is received by the content source.

In some embodiments, the response initiator may be a displayed initiator, which may be manually inputted into the content source, such that the content source receives the displayed initiator, at 60. For example, in some embodiments, a user may have a laptop computer in the same room as the display system. In such a situation, the user may simply read the displayed initiator and input the displayed initiator (such as a number) into their computer. Alternatively, in some embodiments, a content source, such as a user's computer may be in a remote location relative to the location of the display system. In such a situation, a viewer disposed in the same room as the display system may be able to read the displayed initiator and communicate (such as via phone or through a network) the displayed initiator to an operator who is operating the content source. The operator may input the displayed initiator as communicated by the viewer. As discussed above, in other embodiments, the initiator may be automatically received by the content source without manual input by a user.

Once the displayed initiator is inputted into the content source, it is determined whether the displayed initiator matches the generated initiator, at 62. If the displayed initiator does not match the generated initiator, the conversation between the content source and the display system may be aborted, as indicated at 64. Alternatively, if the displayed initiator matches the generated initiator, the conversation between the content source and the display system may begin. As discussed above, the conversation may begin with sharing of a secret key.

Although the above security system is described in relationship to display systems, it should be appreciated that such a system may be used with other devices receiving content over an unsecured communication link. For example, the security system disclosed herein may be used to secure content transmitted over a wireless network from a content source to a telephone, a personal data assistant, a computer, a home-entertainment system, etc.

In some embodiments, the above method, in full or in part, may be contained on a computer-readable medium. For example, a computer-readable medium may include instructions executable by a computing device to perform a method for use in securing transmission of content over a wireless network. In some embodiments, the instructions on the computer readable medium, may include, in whole, or in part, a method including initiating a relationship between a content source and a display system; establishing a relationship between the content source and the display system including negotiating a shared key; and encrypting content for transmission between the content source and the display system. In other embodiments, the instructions may recite a method including transmitting a challenge to a display system over a wireless network, receiving a response to the challenge and confirming the response matches the challenge. The method further may include negotiating a shared key with the display system and/or encrypting content and transmitting encrypted content to the display system.

Thus, in one embodiment, a method is provided for securing transmission of content over a wireless network. In one embodiment, the method may include initiating a relationship between a content source and a display system. The method further may include establishing a relationship between the content source and the display system including negotiating a shared key and encrypting content for transmission between the content source and the display system.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of securing transmission of content over a wireless network, the method comprising:
   initiating a challenge-response protocol between a content source and a display system, wherein the initiating includes inputting into the content source transmitted data sent from the content source to the display system;
   confirming correlation of the challenge-response protocol;
   establishing a relationship between the content source and the display system including negotiating a shared encryption key, subsequent to confirmation of the challenge-response protocol; and
   encrypting content for transmission between the content source and the display system,
   wherein initiating a challenge-response protocol between a content source and a display system includes:
   generating a generated initiator;
   transmitting the generated initiator to the display system;
   receiving a response initiator; and
   confirming that the response initiator matches the generated initiator.

2. The method of claim 1, wherein inputting into the content source transmitted data includes manually inputting transmitted data.

3. The method of claim 1, wherein inputting into the content source transmitted data includes automatic input of the transmitted data into the content source, such that the content source automatically receives the transmitted data.

4. The method of claim 1, wherein receiving a response initiator and confirming that the response initiator matches the generated initiator includes:
   displaying a transmitted initiator;
   inputting a displayed initiator into the content source; and
   confirming that the displayed initiator matches the generated initiator.

5. The method of claim 1, wherein receiving a response initiator includes:
   automatically receiving a generated initiator; and
   automatically transmitting a response initiator to the content source.

6. The method of claim 1, wherein establishing a relationship between the content source and the display system includes negotiating a shared key using a Diffie-Hellman key exchange.

7. The method of claim 1, wherein encrypting content for transmission between the content source and the display system includes using the AES cryptosystem.

8. The method of claim 1, wherein the generated initiator is a number or an alphanumeric code.

9. The method of claim 1, further comprising:
initiating a second challenge-response protocol between the content source and the display system, wherein the second challenge-response protocol ensures that the content source is an authentic content source; and
confirming correlation of the second challenge-response protocol.

10. The method of claim 9, wherein the second challenge-response protocol is initiated based on a pre-determined time during the transmission.

11. The method of claim 10, wherein wherein a subsequent plurality of challenge-response protocols are initiated periodically during the transmission.

12. A system for securing transmission of content over a wireless network, the system comprising:
a wireless network;
a content source configured to transmit content via the wireless network;
a display system linked to the wireless network and configured to receive content from the content source;
wherein the content source is configured to initiate a relationship with the display system using a challenge-response protocol and subsequently negotiate a shared encryption key based on the challenge-response protocol, initiation of the relationship including input into the content source of transmitted data sent from the content source to the display system, and
wherein initiating a challenge-response protocol between a content source and a display system includes:
generating a generated initiator;
transmitting the generated initiator to the display system;
receiving a response initiator; and
confirming that the response initiator matches the generated initiator.

13. The system of claim 12, wherein the content source is further configured to transmit encrypted content to the display system.

14. The system of claim 13, wherein the display system is configured to decrypt the content received from the display system.

15. The system of claim 14, wherein receiving the displayed initiator includes manually inputting the displayed initiator into the content source.

16. The system of claim 12, wherein the content source is a computer and the display is a projector.

17. The system of claim 12, wherein the content source and the display are located in the same building.

18. On a non-transitory computer-readable storage medium, instructions executable by a computing device to perform a method for use in securing transmission of content over a wireless network, the method comprising:
transmitting a challenge to a display system over a wireless network from a content source;
inputting into the content source transmitted data sent from the content source to the display system;
confirming the response matches the challenge; and
negotiating of a shared encryption key exchange subsequent to confirmation that the response matches the challenge,
wherein initiating a challenge-response protocol between a content source and a display system includes:
generating a generated initiator;
transmitting the generated initiator to the display system;
receiving a response initiator; and
confirming that the response initiator matches the generated initiator.

19. The method of claim 18, wherein transmitting a challenge includes wirelessly sending an initiator to the display system.

20. The method of claim 19, wherein receiving a response to the challenge includes manually inputting the initiator into the content source.

21. The method of claim 18, further comprising encrypting content and transmitting encrypted content to the display system.

22. The method of claim 18, wherein the generated initiator is a random number.

23. The method of claim 22, wherein the random number is changed from a previous challenge response protocol.

24. The method of claim 22, wherein the random number is changed for subsequent challenge response protocols.

* * * * *